US007813720B2

(12) United States Patent
Doffman

(10) Patent No.: US 7,813,720 B2
(45) Date of Patent: Oct. 12, 2010

(54) MOBILE MICRO-BAND INFORMATION DISTRIBUTION

(75) Inventor: Zak Doffman, London (GB)

(73) Assignee: Accenture Global Services GmbH, Schaffhausen (CH)

( * ) Notice: Subject to any disclaimer, the term of this patent is extended or adjusted under 35 U.S.C. 154(b) by 796 days.

(21) Appl. No.: 10/567,447

(22) PCT Filed: Aug. 20, 2004

(86) PCT No.: PCT/EP2004/009362

§ 371 (c)(1),
(2), (4) Date: Jan. 8, 2007

(87) PCT Pub. No.: WO2005/020609

PCT Pub. Date: Mar. 3, 2005

(65) Prior Publication Data

US 2007/0191032 A1    Aug. 16, 2007

(30) Foreign Application Priority Data

Aug. 20, 2003   (EP)   .................................. 03018919

(51) Int. Cl.
 *H04M 3/42*   (2006.01)
(52) U.S. Cl. .................... 455/414.1; 370/259; 379/157; 379/158
(58) Field of Classification Search ................. 455/419, 455/414.1; 370/259; 379/157, 158
See application file for complete search history.

(56) References Cited

U.S. PATENT DOCUMENTS

| 5,944,790 | A | * | 8/1999 | Levy | ........................... 709/218 |
| 6,125,281 | A | | 9/2000 | Wells et al. | |
| 6,647,260 | B2 | * | 11/2003 | Dusse et al. | ................. 455/419 |
| 6,892,228 | B1 | * | 5/2005 | Penders | ...................... 709/219 |
| 2004/0203338 | A1 | * | 10/2004 | Zilliacus | .................... 455/3.04 |
| 2004/0210479 | A1 | * | 10/2004 | Perkowski et al. | ............ 705/14 |
| 2005/0054325 | A1 | * | 3/2005 | Morper | ........................ 455/410 |
| 2005/0114798 | A1 | * | 5/2005 | Jiang et al. | .................. 715/864 |
| 2006/0030295 | A1 | * | 2/2006 | Adams et al. | ............... 455/410 |

FOREIGN PATENT DOCUMENTS

| EP | 1 039 768 | | 9/2000 |
| EP | 1 262 931 A1 | * | 4/2002 |
| EP | 1 262 931 | | 12/2002 |
| GB | 2 376 841 | | 12/2002 |
| GB | 2382267 | | 5/2003 |
| WO | WO 97/41654 | | 11/1997 |
| WO | WO 01/03456 | | 1/2001 |
| WO | WO 01/63883 | | 8/2001 |
| WO | WO 01/72001 | | 9/2001 |

* cited by examiner

*Primary Examiner*—Nick Corsaro
*Assistant Examiner*—Isaak R Jama
(74) *Attorney, Agent, or Firm*—Mannava & Kang, P.C.

(57) ABSTRACT

Methods and systems for providing information to mass localized mobile users over a limited bandwidth are described. Short text messaging system messages, e.g., SMS, may be used to transmit coded data between mobile terminals and content providers, while a client application resident on each mobile terminal can decode the messages received from a content provider and display information in human-understandable formats on the display screen of the mobile terminal. The client application can also encode messages to send to the content provider to request specified information on demand. Users can also specify criteria that, when met, the content provider automatically sends an encoded SMS message to the user's mobile terminal with the requested information, provided the user has prepaid to receive SMS messages.

25 Claims, 7 Drawing Sheets

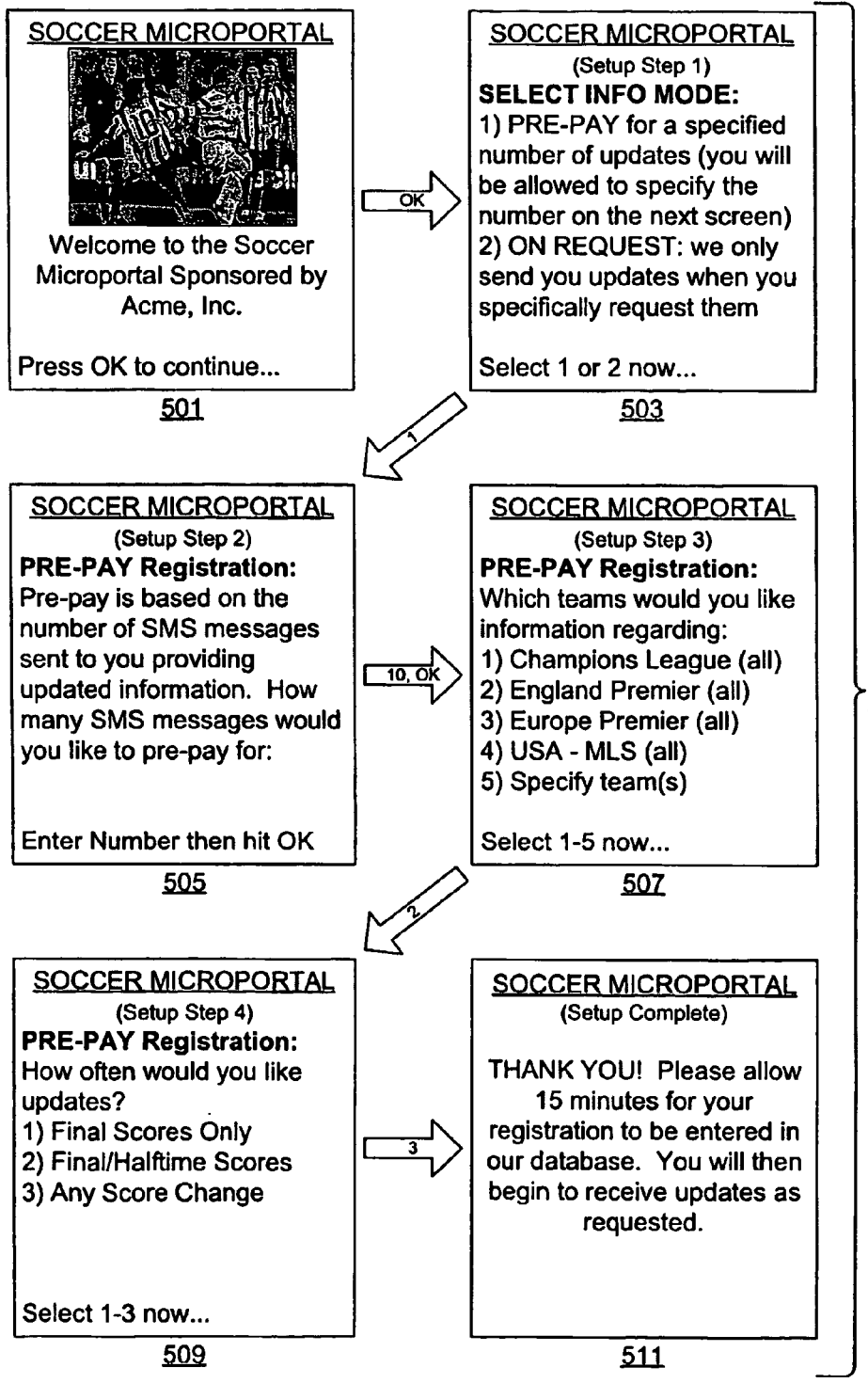

MOBILE MICRO-BAND INFORMATION DISTRIBUTION

This application is a National Stage application of co-pending PCT application PCT/EP2004/009362 filed Aug. 20, 2004, which was published under PCT Article 21(2) on Mar. 3, 2005, which claims priority from European patent application 03018919.5 filed on Aug. 20, 2003. These applications are incorporated herein by reference in their entirety.

FIELD OF THE INVENTION

The invention relates generally to mobile telecommunications and information delivery. More specifically, the invention relates to an instant messaging architecture that can be used to deliver selected information to end users on a massive scale within a localized area in a restricted bandwidth environment.

BACKGROUND OF THE INVENTION

Wireless communications are now ubiquitous in our society. It is not uncommon for adults and children alike to carry a mobile telephone everywhere they go. As the technology of mobile telephones has advanced, mobile telephones began to provide advanced features such as instant messaging, Internet access, email, and the like. Integrated mobile telephones with the capabilities of a personal digital assistant (PDA) are commonplace, taking full advantage of new generations of mobile telecommunications networks (presently 3G).

A result of increased usage of mobile telephones with rich information providing features, on networks that provide increased bandwidth, is that when a critical mass of users are located near each other such that they each are in communication with a mobile telecommunications network through a single (or a couple of) base station, the available bandwidth is quickly consumed and quality of service (i.e., available bandwidth per user) quickly deteriorates.

For example, there are often over 50,000 people present at individual sporting events, such as a baseball, football, or soccer game, held in an arena or stadium. At other outdoor events, such as an automobile race, golf tournament, or in an amusement park, 100,000 or more fans may attend on any given day. The result of this congestion of people in a localized area, each equipped with a mobile telephone providing Internet connectivity or other information access capabilities, is that if every user attempts to log on to the Internet and retrieve information from a web browser, then quality of service will deteriorate as there is only a fixed amount of bandwidth available for all users to share through any given base station. As quality of service goes down, user frustration levels go up.

Even assuming each mobile telephone may be capable of providing 3G bandwidth (approximately 144 Kbps-2 Mbps data peak throughput), there are inherent bandwidth limitations of each mobile telecommunications provider. That is, the connection between the Internet and the base station through which the users are connecting to the Internet (referred to as a trunk line) has a limited bandwidth. Suppose a given trunk line has a bandwidth of 1 Gbps (1 Gbps≈1,000 Mbps≈1,000,000 kbps). Providing full 3G bandwidth (2 Mbps) to each connected user would allow only 500 users to connect at a given time with full bandwidth via that trunk line. Thus, to accommodate additional users, when the bandwidth of the connection between the base station and the Internet is fully exhausted by users at maximum 3G bandwidth, the mobile telecommunications carrier may gradually reduce the bandwidth available to each user as new users connect to the Internet or some other information provider.

In the above example, if 1,000 users desire a data connection, each user might receive only 1 Mbps bandwidth. If 50,000 users desire a data connection at a given time, e.g., at a sporting event, then each user will receive only 20 kbps. This is roughly the equivalent of the capabilities of modems from the late 1980's, and hardly sufficient to browse Internet web pages where graphics and multimedia abound. In addition, a more likely outcome is not that users receive low bandwidths, but rather that users receive no bandwidth at all. Once a base station become saturated, users are likely to receive a "No Signal," "Network Failure", or "No GPRS" error message, or the like. In such a case, in addition to not being able to establish a data connection, users will also not be able to establish a voice connection to make a normal telephone call, which presents a potentially serious safety concern.

While a possible solution to this problem is for mobile telecommunications providers to upgrade their networks to provide increased bandwidth in trunk lines, this would necessarily result in the mobile telecommunications provider needing to upgrade other resources as well, such as routers, switches, and the like, in order to handle the increased bandwidth. This is presently prohibitively expensive.

In addition, 3G networks are not yet prevalent or widespread. 2G (GSM) and 2.5G (GPRS) networks are presently more common. Thus, the problem illustrated above is even greater for 2G and 2.5G networks, as bandwidths are even lower than bandwidths available in 3G networks. Users will experience more congestion, and are even more likely to become frustrated with their mobile telephone service providers.

Thus, it would be an advancement in the art to provide a mobile telecommunications information distribution system that can provide information to users on a mass scale using relatively limited bandwidth per user. It would be a further advancement in the art to provide a system that is easily scalable regardless of the number of connected users attempting to retrieve information regarding a particular topic.

BRIEF SUMMARY OF THE INVENTION

The following presents a simplified summary of the invention in order to provide a basic understanding of various aspects of the invention. This summary is not an extensive overview of the invention, and it is not intended to identify key or critical elements of the invention. The following summary merely presents some concepts of the invention in a simplified form as a prelude to the more detailed description provided below.

To overcome limitations in the prior art described above, and to overcome other limitations that will be apparent upon reading and understanding the present specification, the present invention is directed to an information distribution system that may be used on a mass scale to provide information to a highly concentrated or localized mass of mobile terminals attempting to communicate from the same or near same locations, e.g., through one or two neighboring base stations.

A first aspect of the invention provides a mobile terminal with a resident client application that can encode and decode messages received from one or more content providers. The client application, upon decoding a received message, can display the decoded information in a human-understandable format on the mobile terminal's display screen.

Another aspect of the invention provides a client application that can be installed on a mobile terminal to encode and decode messages received from one or more content providers. The client application, upon decoding a received message, can display the decoded information in a human-understandable format on the mobile terminal's display screen. A user of the client application can request that information updates from the content provider be provided only on-request by the user ('pull' mode of operation) or the user can prepay for updates and specify the criteria by which updates should be sent automatically to the user's mobile terminal ('push' mode of operation).

Another aspect of the invention provides a method for a content provider to provide information to mass localized mobile terminals in a limited bandwidth environment. The content provider, upon receiving a request from a mobile terminal, queries a database for the requested information and generates a coded response message containing the requested information. The messages between the content provider and mobile terminals may be sent over an asynchronous, connectionless-based channel so as to minimize overhead and required bandwidth per message as well as allowing delayed delivery through queuing (e.g., an SMSC attempts delivery of an SMS multiple times).

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 5 illustrates sequential screen shots during a sign up process according to an illustrative embodiment of the invention.

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

Figure 1:
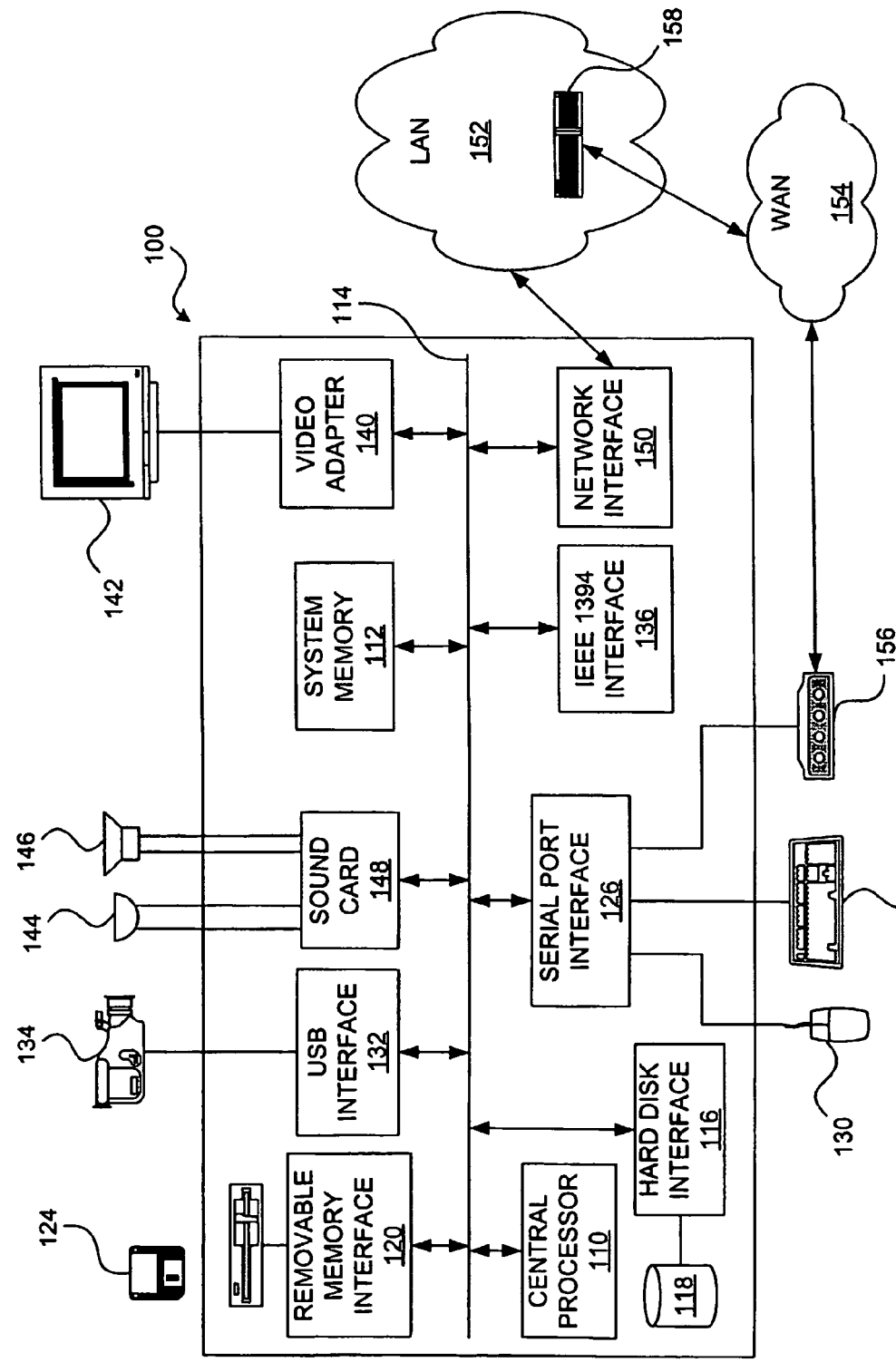
FIG. 1 illustrates a block diagram of a computer that may be used to implement one or more aspects of the invention.

In order to provide information to users, using only limited bandwidth, on a mass scale, aspects of the invention provide for the coding and decoding of messages to send to a user, where the message is not dependant on a synchronous data connection. An application program running on each mobile terminal can code and send request messages, and receive and decode the response messages to provide information to an end user. One or more aspects of the invention may be embodied in one or more computers and computer systems, such as is illustrated in FIG. 1. In FIG. 1, computer 100 includes a central processor 110, a system memory 112 and a system bus 114 that couples various system components including the system memory 112 to the central processor unit 110. System bus 114 may be any of several types of bus structures including a memory bus or memory controller, a peripheral bus, and a local bus using any of a variety of bus architectures. The structure of system memory 112 is well known to those skilled in the art and may include a basic input/output system (BIOS) stored in a read only memory (ROM) and one or more program modules such as operating systems, application programs and program data stored in random access memory (RAM).

Computer 100 may also include a variety of interface units and drives for reading and writing data. In particular, computer 100 includes a hard disk interface 116 and a removable memory interface 120 respectively coupling a hard disk drive 118 and a removable memory drive 122 to system bus 114. Examples of removable memory drives include magnetic disk drives and optical disk drives. The drives and their associated computer-readable media, such as a floppy disk 124 provide nonvolatile storage of computer readable instructions, data structures, program modules and other data for computer 100. A single hard disk drive 118 and a single removable memory drive 122 are shown for illustration purposes only and with the understanding that computer 100 may include several of such drives. Furthermore, computer 100 may include drives for interfacing with other types of computer readable media A user can interact with computer 100 with a variety of input devices. FIG. 1 shows a serial port interface 126 coupling a keyboard 128 and a pointing device 130 to system bus 114. Pointing device 128 may be implemented with a mouse, track ball, pen device, or similar device. Of course one or more other input devices (not shown) such as a joystick, game pad, satellite dish, scanner, touch sensitive screen or the like may be connected to computer 100.

Computer 100 may include additional interfaces for connecting devices to system bus 114. FIG. 1 shows a universal serial bus (USB) interface 132 coupling a video or digital camera 134 to system bus 114. An IEEE 1394 interface 136 may be used to couple additional devices to computer 100. Furthermore, interface 136 may be configured to operate with particular manufacturer interfaces such as FireWire developed by Apple Computer and i.Link developed by Sony. Input devices may also be coupled to system bus 114 through a parallel port, a game port, a PCI board or any other interface used to couple an input device to a computer.

Computer 100 also includes a video adapter 140 coupling a display device 142 to system bus 114. Display device 142 may include a cathode ray tube (CRT), liquid crystal display (LCD), field emission display (FED), plasma display or any other device that produces an image that is viewable by the user. Additional output devices, such as a printing device (not shown), may be connected to computer 100.

Sound can be recorded and reproduced with a microphone 144 and a speaker 146. A sound card 148 may be used to couple microphone 144 and speaker 146 to system bus 114. One skilled in the art will appreciate that the device connections shown in FIG. 1 are for illustration purposes only and that several of the peripheral devices could be coupled to system bus 114 via alternative interfaces. For example, video camera 134 could be connected to IEEE 1394 interface 136 and pointing device 130 could be connected to USB interface 132.

Computer 100 can operate in a networked environment using logical connections to one or more remote computers or other devices, such as a server, a router, a network personal computer, a peer device or other common network node, a wireless telephone or wireless personal digital assistant. Computer 100 includes a network interface 150 that couples system bus 114 to a local area network (LAN) 152. Networking environments are commonplace in offices, enterprise-wide computer networks and home computer systems.

A wide area network (WAN) 154, such as the Internet, can also be accessed by computer 100. FIG. 1 shows a modem unit 156 connected to serial port interface 126 and to WAN 154. Modem unit 156 may be located within or external to computer 100 and may be any type of conventional modem such as a cable modem or a satellite modem. LAN 152 may also be used to connect to WAN 154. FIG. 1 shows a router 158 that may connect LAN 152 to WAN 154 in a conventional manner.

It will be appreciated that the network connections shown are exemplary and other ways of establishing a communications link between the computers can be used. The existence of any of various well-known protocols, such as TCP/IP, Frame Relay, Ethernet, FTP, HTTP and the like, is presumed, and computer 100 can be operated in a client-server configuration to permit a user to retrieve web pages from a web-based server. Furthermore, any of various conventional web browsers can be used to display and manipulate data on web pages.

The operation of computer 100 can be controlled by a variety of different program modules. Examples of program modules are routines, programs, objects, components, data structures, libraries etc., that perform particular tasks or implement particular abstract data types. The present invention may also be practiced with other computer system configurations, including hand-held devices, multiprocessor systems, microprocessor-based or programmable consumer electronics, network PCS, minicomputers, mainframe computers, personal digital assistants, mobile telephones and the like. Furthermore, the invention may also be practiced in distributed computing environments where tasks are performed by remote processing devices that are linked through a wireless or wired communications network. In a distributed computing environment, program modules may be located in both local and remote memory storage devices.

Figure 2:
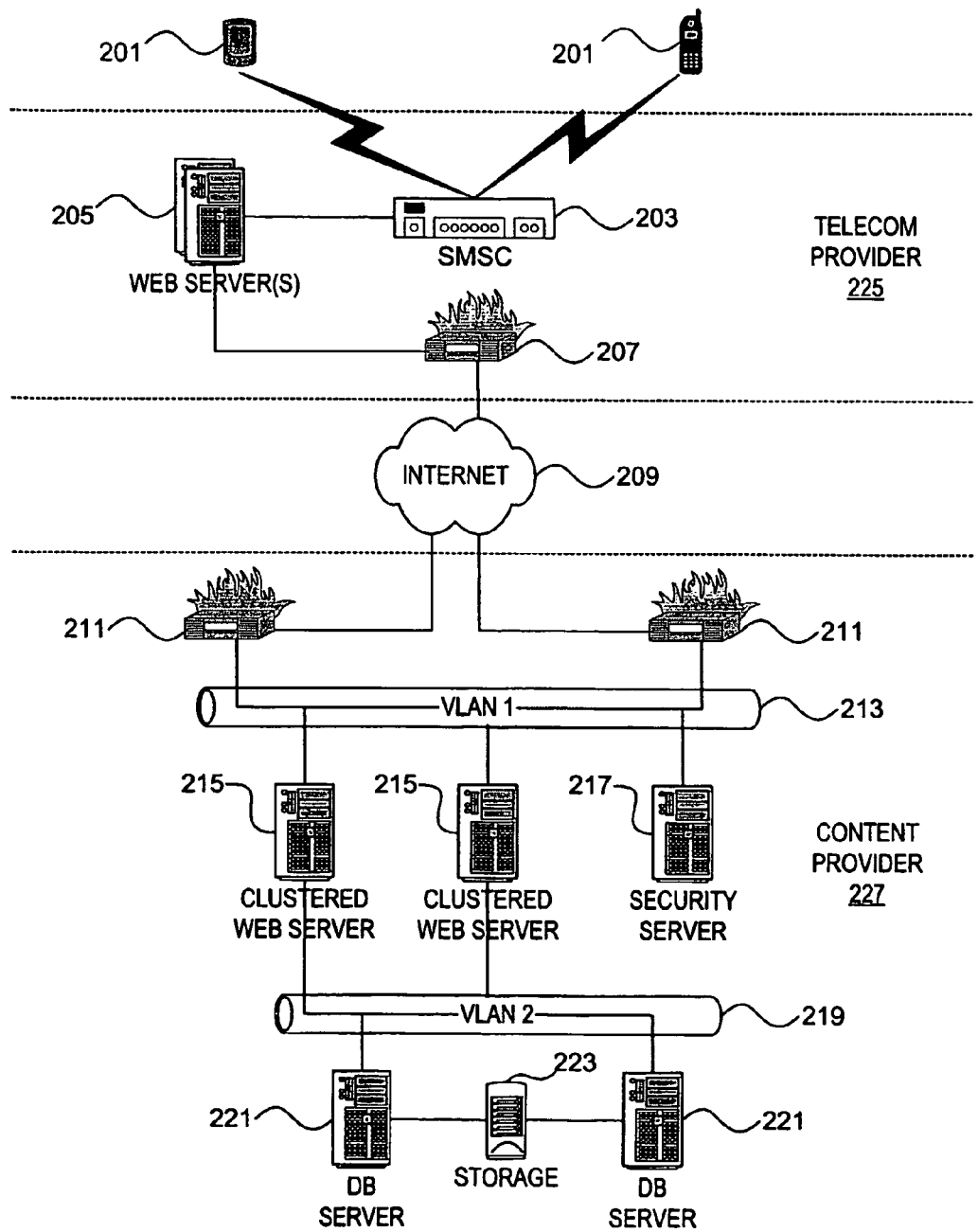
FIG. 2 illustrates an example of a network architecture that may be used to implement one or more aspects of the invention.

FIG. 2 illustrates a mobile telecommunications network architecture that may be used to implement on or more aspects of the invention according to various illustrative embodiments. The mobile telecommunications network architecture may make use of a short text messaging system such as SMS in order to take advantage of the short text messaging system's fractional use of bandwidth (as compared to other forms of communication), built-in queuing architecture, interoperability across multiple networks and while roaming, etc. Mobile terminals 201 may communicate with SMS Center (SMSC) 203 to send and receive Short Message Service (SMS) messages through telecommunications provider's 225 wireless network (not shown). For purposes of illustration, only one SMSC is shown. However, it will be appreciate that more than one SMSC may be used to more efficiently route SMS messages. A mobile terminal may be any wireless device that can communicate via SMS, Extended Message Service (EMS, or SMS+), Multimedia Message Service (MMS), or similar messages. SMSC 203 may be connected to one or more web servers 205 through which messages may be sent to one or more content providers 227 over the Internet or other WAN when applicable. Thus, when a SMS message is received by the telecommunications provider 225 from a mobile terminal 201, the telecommunications provider 225 passes the SMS message to the content provider 227 via an API over a network such as the Internet 209. SMSC 203, Web servers 205, and firewall 207 may be maintained and controlled by a mobile telecommunications provider 225, e.g., Sprint PCS.

Messages routed to content provider 227 may pass through one or more firewalls 211 on the content provider's network before entering a first virtual LAN 213 of the content provider, where the message is ultimately routed to a cluster of web servers 215 and/or passing through security server 217. Security server 217 may be a Microsoft Active Directory or LDAP equivalent server, or may be a security server known to those of skill in the art, for authenticating inbound communications. Multiple security servers may be used (not shown) to provide redundancy and, thus, added security. The web server cluster 215 interprets the message to determine what the sending user has requested, and obtains the requested data through second virtual LAN 219 via one or more database servers 221. Database servers 221 may obtain the information from independent or shared storage 223. Upon obtaining the information requested in the request message received from mobile terminal 201, web server cluster 215 sends a response message back through a similar path to the requesting mobile terminal. According to another aspect of the invention, described further below, web server cluster 215 may push messages to a mobile terminal 201 automatically without waiting for a specific request for information.

Figure 3:
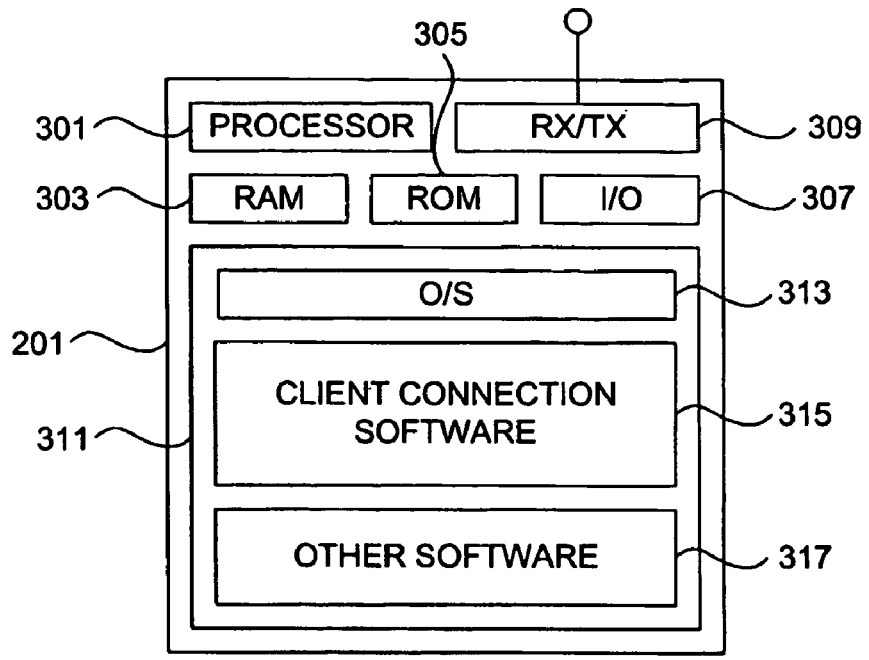
FIG. 3 illustrates a block diagram of a mobile terminal according to an illustrative embodiment of the invention.

FIG. 3 illustrates a block diagram of a mobile terminal 201 according to an illustrative embodiment of the invention. Mobile terminal 201 may include a processor 301, RAM 303, ROM 305, Input/Output subsystem 307, transceiver 309, and memory 311. Input/output subsystem 307 may include a keypad, microphone, and/or other input devices and/or ports, as well as a display screen, speaker(s), and/or other output devices and/or ports. Memory 311 may store software that controls the operation of the mobile terminal under various circumstances, e.g., operating system 313 to control basic operation, making calls, etc., client software 315 to communicate with content provider(s) according to one or more aspects of the invention as described herein, and other software 317 (e.g., calendar, email, phonebook, games, etc.).

The client application is a simple program executable by the mobile terminal for providing requested information on a selected topic. The client application may be thought of as providing access to a microportal to the selected topic. The client application, generally, is responsible for coding and decoding messages, such as SMS messages, sent between the mobile terminal and a content provider providing content for that specific client application's selected topic, and for the display of the decoded information to the user in a human-understandable format via the display screen of the mobile terminal. The client application may be programmed in any number of languages suitable for a given mobile terminal, e.g., J2ME, Embedded C++, etc., depending on the mobile terminal's operating system and installed components, e.g., Pocket PC, Java, Smartphone, Symbian, etc. As used herein, a coded message may refer to any message that has been manipulated from human understandable format, including messages that have been compressed and/or encrypted.

The client application may use a set of short codes for compressing information. That is, in an embodiment of the invention, messages sent between mobile terminals and content providers are sent as SMS messages. However, SMS messages generally can carry only 120-160 alphanumeric characters (western alphabet) per message. In order to carry more information per message than the maximum 160 characters, and also to allow SMS messages to carry graphical information as well as text, the client application and content provider may communicate using short codes and/or other compressed coded data so that each SMS message can be decompressed to provide more than 160 characters of human-understandable text. That is, the coded messages in their compressed format are typically not easily readable (if at all) by an end user. A unique individual may be able to or may take the time learn to read compressed or encrypted data, however as referred to herein, compressed data refers to data compressed in such a format, e.g., by using short codes, that the average user would not be able to readily understand the coded message without undue thought or consideration. The client application may contain logic to interpret the coded messages and present them as human-understandable text (e.g., text in a native language of the user), audio, or video to the end user. Long SMS messages may also be used, but billing (discussed below) may still be based on standard length SMS messages sent. In addition, because different mobile telephones may handle long SMS messages differently, and because each mobile telephone may have different characteristics (screen size, color capabilities, etc.) or have different operating software capabilities (e.g., Java, Symbian, Palm, Smartphone, Microsoft Windows Mobile™, etc.) each custom microportal may have to be further customized for specific models and/or types of mobile telephones.

In order to keep client application sizes small, each client application is preferably customized for a single microportal content provider or selected topic. That is, a first client application may be used in conjunction with a soccer microportal, while a second client application may be used in conjunction with a World Rally Championship (WRC) microportal. Short codes may also be customized per microportal. That is, a first set of short codes may be used by a client application providing access to the soccer information microportal, while a second set of short codes may be used by a client application providing access to the WRC information microportal. In each of the soccer and WRC microportal client applications, unique short codes are used to refer to information provided by each respective microportal. For example, in a soccer microportal, the code "MU" may be used to refer to the club Manchester United, while "MC" may be used to refer to the club Manchester City. As will be appreciated, Manchester United and Manchester City have little or no relevance to a WRC microportal. While the codes "MU" and "MC" may be used by the WRC microportal, it is likely that they would be used to refer to different information, e.g., "MC" might refer to the Monte Carlo rally in the WRC microportal.

The client application may include all the default short codes and the items to which they refer. That is, the client application may include a table of short codes and their respective "long" identifiers so that the client application can translate the received coded messages into human understandable formats. An example of a portion of a short code table that may be used in a WRC microportal is illustrated below.

| Short Code | Long Identifier | Description/Type |
|---|---|---|
| RB | Richard BURNS | Driver |
| CS | Carlos SAINZ | Driver |
| MG | Marcus GRÖNHOLM | Driver |
| MM | Markko MÄRTIN | Driver |
| PS | Petter SOLBERG | Driver |
| MC | Monte Carlo | Rally |
| SE | Sweden | Rally |
| TK | Turkey | Rally |
| AR | Argentina | Rally |
| GR | Greece | Rally |
| F | Ford | Manufacturer |
| S | Subaru | Manufacturer |
| P | Peugeot | Manufacturer |
| C | Citroen | Manufacturer |
| H | Hyundai | Manufacturer |

Those of skill in the art will appreciate that the above listing is merely a sampling of short codes that can be used according to an illustrative embodiment. Unlimited alternative or additional short codes may be used depending on the needs and requirements of the specific microportal and client application (e.g., news, stocks, sports, entertainment, politics, etc.). The client application may use the corresponding description or type to determine what information to display and/or how to order the output.

In addition to unique short codes per client application, there may also be administrative short codes that remain consistent from client application to client application and are used for the same purpose in each client application. Examples of such administrative short codes include a short code that may be used to instruct the client application, e.g., to flush its memory, to indicate that all prepaid SMS messages for a Push mode of operation (described below) have been used, to perform account management functions, subscription information (e.g., new services), inform the user that an event is about to begin (or end), to inform the user that an updated client is available, etc. Administrative short codes may be part of the core logic of each client application, whereas unique short codes may be part of custom look and feel, or skin, for a client application to meet the needs and demands of the selected topic, content provider, and end-users. Administrative short codes may also be used to provide advertising information within the custom microportal on the client device.

Using short codes and/or other compression techniques, SMS messages can transmit the equivalent of more than 500 characters of human readable text. Any known compression technique may be used in addition to the use of short codes. Alternatively, open source algorithms or those embedded in a particular language, e.g., C# or Perl, could be used. For example, hex coding could be used to further reduce the amount of bits required per unit data. Those of skill in the art will appreciate that any known text compression technique can be used.

The operation of an illustrative embodiment of the invention will now be described in further detail with reference being made to FIGS. 4-7.

Figure 4:
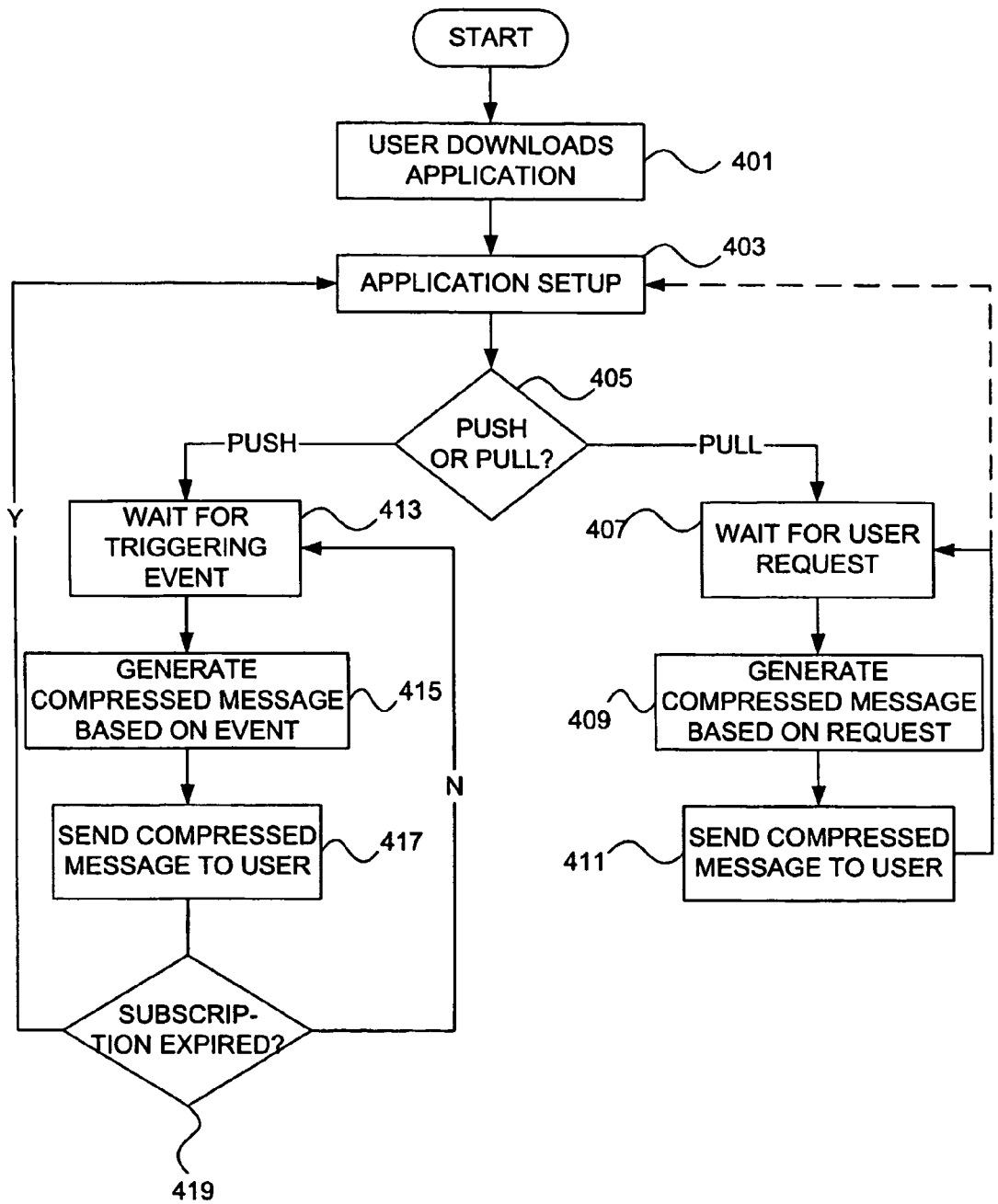
FIG. 4 illustrates a method for distributing information according to an illustrative embodiment of the invention.

FIG. 4 illustrates a flowchart of a method for requesting and receiving information according to an illustrative embodiment of the invention. Initially, in step 401, a user of a mobile terminal obtains client software for the mobile terminal. The client software 315 may be downloaded from the Internet, requested to be delivered in an MMS message, received (or "beamed") from another mobile terminal, or received via a direct connection with a computer or other device. It will be appreciated that the manner in which the client application is received is secondary to its presence on the mobile terminal. According to an aspect of the invention, each client application may be distributed for free, whereas users might be required to pay for content in the form of paying for SMS messages containing the coded information updates.

In step 403 the user sets up the client application to receive update messages. FIG. 5 illustrates screen shots during an example of a setup process for a soccer microportal. In FIG. 5, the block arrows with embedded text indicate the selection that was made from one screenshot to transition to the next screenshot. When the client application is initially launched for the first time on a mobile terminal, the client application may display welcome screen 501 with applicable instructions to the user. Before the user can begin to receive compressed messages, the user may select a mode of operation for the client application. Two possible modes of operation include a Push mode, also referred to as Pre-Pay, and a Pull mode, also referred to as On-Request.

In the Push mode of operation, a user prepays for a certain number of updates, for an event, or some other predetermined period of time, and specifies the criteria that must be met before the content provider sends an update to the user an update. That is, the user subscribes to a particular server or content provider, and registers his or her interest in certain events and/or certain information. When the specified criteria are met, or when a relevant event occurs, the content provider automatically sends a coded message containing the requested information to the user's mobile terminal.

In the Pull mode of operation, the content provider only sends coded messages to the user's mobile terminal when information is explicitly requested by the user. The user thus only pays for updates that the user specifically requests, because the SMS messages can be (and typically will be) reverse billed to the receiving user by the content provider. Using the Pull mode, the user asks for a certain piece of information through the client application, which triggers the client application to generate and send a coded request message to the content provider. The content provider's server then sends a coded response message with the requested information. That is, when the user instructs the client application to send a request for specific information to the content provider associated with that client application, the content provider retrieves the requested information and returns it to the mobile terminal in the form of a coded response message.

Screen 503 illustrates a selection screen from which a user may select either a Push/Pre-Pay mode or a Pull/On-Request mode. Upon selecting the Push option, screen 505 may be displayed, through which the client application queries the user for the number of messages for which the user would like to prepay. Upon entering a number of messages and selecting 'OK', screen 507 may be displayed to the user querying for the type of information about which the user would like to be updated. The menus may be organized hierarchically so that a user can "drill down" to identify the information he or she would like to receive. After making a selection, e.g., selection '2', the client application displays screen 509 which queries the user regarding how often updates should be sent. Upon making a selection on screen 509, the client application may display screen 511 indicating that the user's selections have been sent to the content provider. Simultaneously or near simultaneously, the client application compiles a compressed message with the selected information and sends it to the content provider, who further charges the user accordingly and sets up in the content provider database the Push information associated with that user's mobile terminal.

Figure 6:
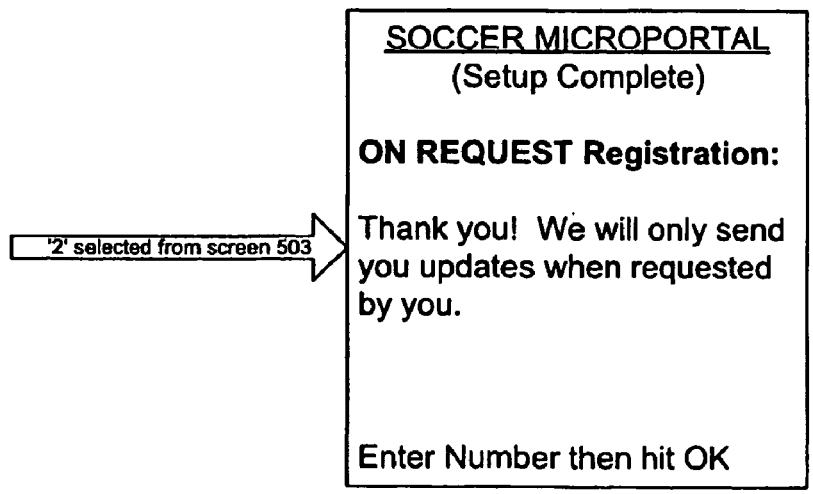
FIG. 6 illustrates a sequential screen shot during the sign up process illustrated in FIG. 5, when an alternative selection is made.

FIG. 6 illustrates a screen that may be displayed when the user selects the Pull mode from screen 503. Upon selecting the Pull mode, the client application also compiles a coded message and sends it to the content provider associated with that client application. The content provider may update its database to indicate that non-free messages are only to be sent to that mobile terminal upon request. The content provider may still send free updates on a regular or irregular basis, if desired.

Figure 7:
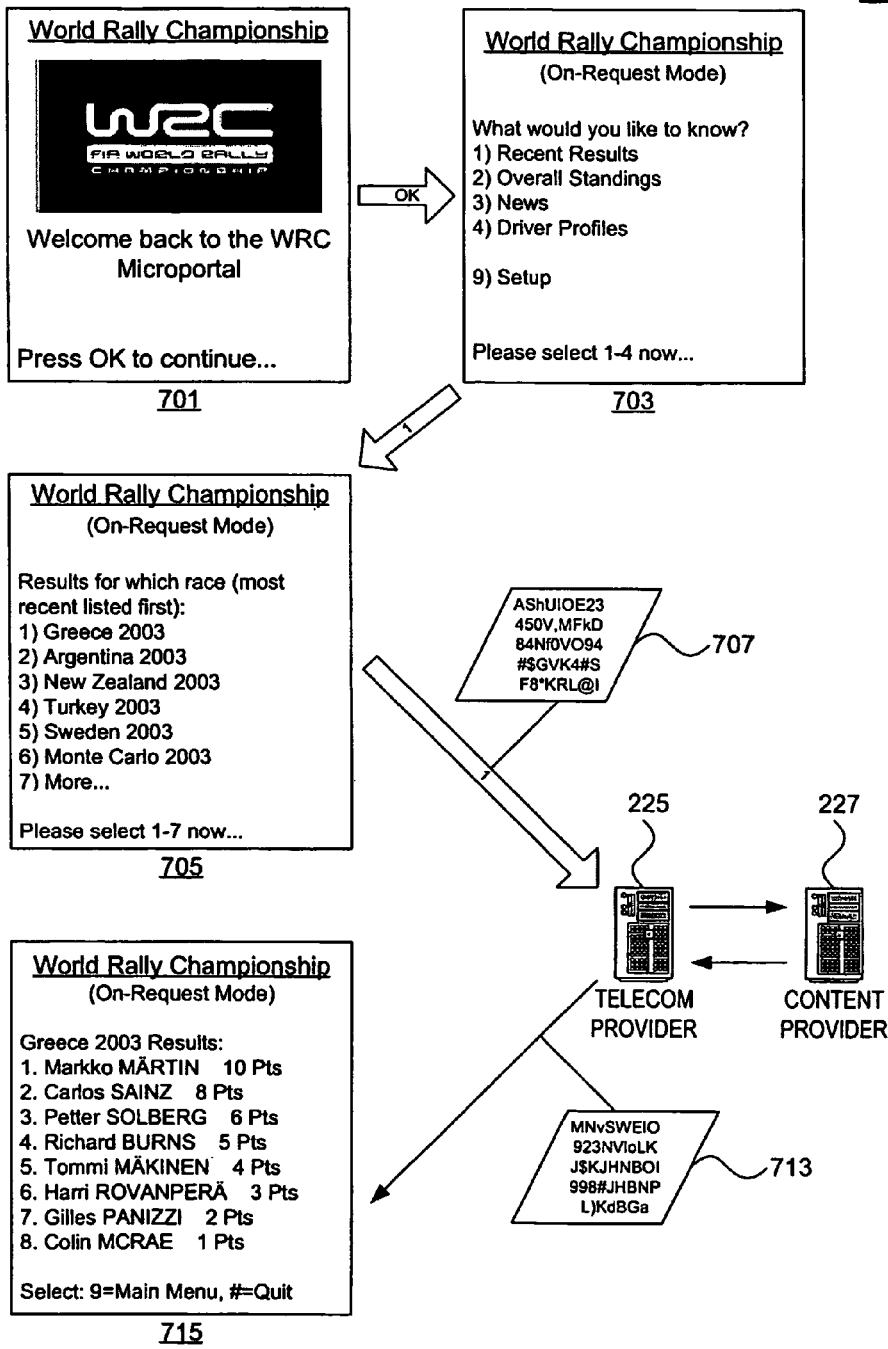
FIG. 7 illustrates screen shots and data flow according to an illustrative embodiment of the invention.

With reference back to FIG. 4, in step 405 the method determines whether the user selected the Push or Pull mode of operation. If the user selects the Pull mode of operation, then steps 407-411 are performed, and are now described in detail with further reference to FIG. 7. FIG. 7 illustrates sample screenshots and data flow that may occur as a result of a user of the client application specifically requesting information from a World Rally Championship content provider in a Pull mode of operation.

Screen 701 illustrates a sample welcome screen when a user launches the WRC client application on the mobile terminal. Main menu screen 703 indicates that the user is in Pull/On-Request mode, and queries the user for the information that the user would like to retrieve. There may also be an option that the user can select in order to re-do the client application setup, e.g., to select the Push mode of operation instead of the Pull mode of operation. The menus may be organized hierarchically so that a user can "drill down" to identify the information he or she would like to receive. In the present example, when the user selects option 1, 'Recent Results,' the client application displays the next screen 705, querying the user for the race for which the user would like recent results. When the user selects option 1, 'Greece 2003', the client application in step 409 creates a coded message 707 and sends it to the content provider 227 via the telecommunications provider 225. The content provider receives the coded message at its clustered web servers 215 (FIG. 2), and retrieves the requested information from database servers 221 and storage 223.

In step 411 the content provider 227, from web servers 215, sends a coded message 713 containing a coded form of the requested information back to the requesting mobile terminal via the telecom provider 225. The client application decodes the coded message and displays the results on the mobile terminal's display screen. Screen 715 illustrates information received back from the WRC content provider regarding results from the rally held in Greece in 2003. While screen 715 illustrates received text information that can be displayed to a user, it will be appreciated that the received information may also or alternatively take the form of audio or video suitable for output via the mobile terminal. Upon completion of step 411, the client application returns to step 407 awaiting further user input requesting more data. Alternatively, the method may return to step 403 where the user may request to enter the Push mode and to prepay for a given number of messages.

In step 405 if the method determines that the user has selected the Push mode during system setup, then the client application does nothing more unless the user subsequently requests a message in the Pull mode of operation (the content provider may, however, send free coded messages to the mobile terminal in order to try to get the user of the mobile terminal to subscribe or request more information). However, in step 413, the content provider waits for a triggering event to occur as defined by the user during the setup process. In the example illustrated in FIG. 5, the content provider automatically sends the mobile terminal a coded message with updated scores when an England Premiership league soccer game reaches halftime or finishes the game. Thus, in step 413, the content provider waits to receive information from its data source (not shown) indicating that an England Premiership league game has reached halftime or has ended, and provides the current score. Upon such an event occurring, the content provider in step 415 prepares a coded message using the applicable short codes and compression algorithms being used, and in step 417 sends the message to the mobile terminal that had requested the "pushed" update.

Upon completion of step 417, the content provider in step 419 checks to see whether the mobile terminal's Push subscription has expired. If so, the content provider may send an additional message with an administrative short code to the mobile terminal indicating that all prepaid SMS messages have been used, and that the user must either resubscribe or use the Pull mode of operation. Alternatively, the content provider may append an administrative short code to the message sent in step 417, where the administrative short code indicates to the client application that all prepaid SMS or other messages have been used.

Those of skill in the art will appreciate that steps of the method described in FIG. 4 may be performed in other than their recited order, and that addition or alternative steps may be performed while staying within the spirit and scope of the invention. In addition, steps may be combined or omitted without departing from the spirit and scope of the invention.

Figure 8:
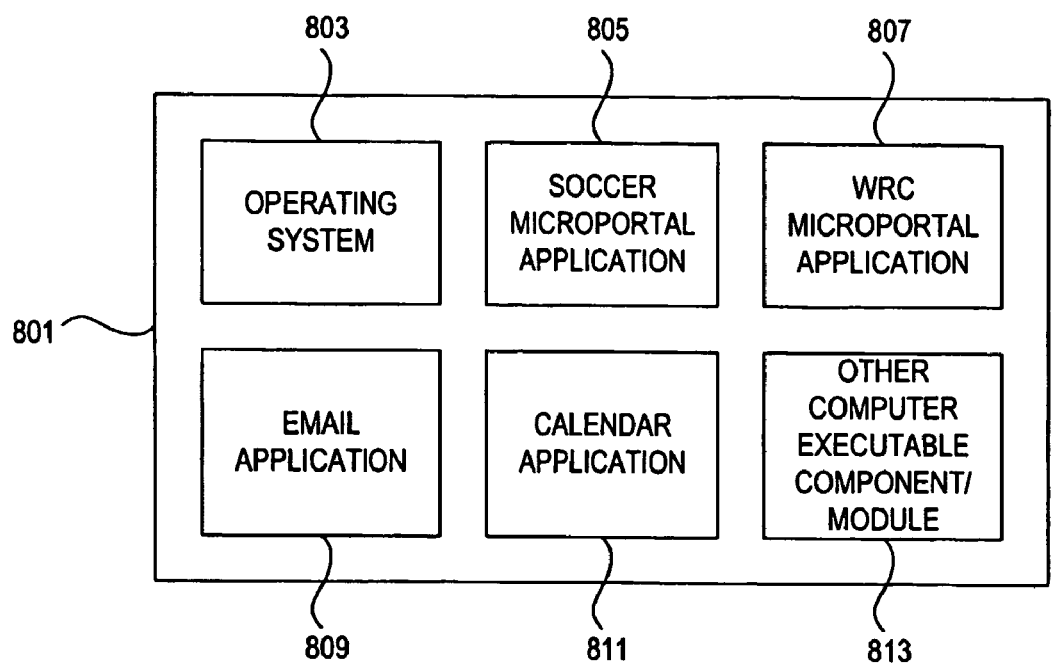
FIG. 8 illustrates a block diagram of a computer readable medium according to an illustrative embodiment of the invention.

The inventive methods may be embodied as computer readable instructions stored on a computer readable medium such as a floppy disk, CD-ROM, removable storage device, hard disk, system memory, embedded memory or other data storage medium. FIG. 8 illustrates a block diagram of a computer readable medium 801 that may be used in accordance with one or more of the above-described embodiments. The computer readable medium 801 stores computer executable components, or software modules, 803-813. More or fewer software modules may alternatively be used. Each component may be an executable program, a data link library, a configuration file, a database, a graphical image, a binary data file, a text data file, an object file, a source code file, or the like. When one or more computer processors execute one or more of the software modules, the software modules interact to cause one or more computer systems to perform according to the teachings of the present invention.

Using one or more aspects of the above-described invention, information can be distributed to users on a mass scale using only limited bandwidth per user. In addition, by using SMS or other connectionless communications systems, an asynchronous or otherwise noncontinuous connection with the Internet or other data network may be used to distribute the information, resulting in reduced overhead per message. Furthermore, SMS has a built in security layer that various aspects of the invention can take advantage of to ensure security and privacy to end-users. In addition to compression of messages using the short codes and/or other compression techniques, data can also be encrypted to provide an additional layer of security in addition to that provided inherently by SMS services.

While the invention has been described with respect to specific examples including presently preferred modes of carrying out the invention, e.g., using standardized SMS messages, those skilled in the art will appreciate that there are numerous variations and permutations of the above described systems and techniques. Any other short text messaging system that provides similar functions as SMS could alternatively be used. Thus, the spirit and scope of the invention should be construed broadly as set forth in the appended claims.

What is claimed is:

1. A mobile terminal, comprising:
   a display screen;
   an input system for receiving user input;
   a wireless communications subsystem;
   a processor;
   memory storing computer executable instructions that, when executed by the processor, cause the mobile terminal to perform a method for retrieving data from a server, comprising:
   (i) loading a first or second local client executable application for decoding a coded short text messaging system message;
   (ii) receiving the coded short text messaging system message from a content provider via the wireless communications subsystem, wherein the coded short text messaging system message comprises compressed data
   (iii) decoding, by the first or second local client executable application, the received short text messaging system message using a set of short codes that comprises short codes unique to the first or second application and instructing the first or second application to translate at least a portion of the received short text messaging system message into a human understandable format, and administrative short codes that are consistent liar the first and second applications and used to instruct the first or second application;
   (iv) displaying information based on said received and decoded unique short codes; and
   (v) instructing said first or second application based on said administrative short codes.

2. The mobile terminal of claim 1, wherein the received short text messaging system message comprises a plurality of short codes to identify individual fields of data.

3. The mobile terminal of claim 1, wherein the human understandable format comprises text in a native language of a user of the mobile terminal.

4. The mobile terminal of claim 1, wherein the human understandable format comprises graphics.

5. The mobile terminal of claim 1, wherein the first or second local client executable application comprises executable code.

6. The mobile terminal of claim 1, wherein the computer executable instructions further cause the mobile terminal to perform the method comprising:
   receiving a second coded short text messaging system message from the content provider via the wireless communications subsystem, wherein the second coded short text messaging system message contains new information updating information in the coded short text messaging system message received in step (ii);
   decoding, by the first or second local client executable application, the second received short text messaging system message;
   displaying information decoded from the second received short text messaging system message on the display screen; and
   flushing from the memory of the mobile terminal information decoded from the coded short text messaging system messages received in step (ii).

7. The mobile terminal of claim 1, wherein the short text messaging system comprises SMS.

8. The mobile terminal of claim 5, wherein the executable code comprises Java.

9. A computer readable medium storing first and second client applications in the form of computer executable instructions that, when executed, cause a mobile terminal to perform a method for receiving information relating to a selected topic, comprising:
   (i) querying a user of the mobile terminal to select one of a push or pull mode of operation;

(ii) when the user selects the push mode of operation:
   a. displaying a plurality of menus to allow the user to identify desired information to remain updated, to identify one or more criteria specifying how often to receive updates, and to identify a number of prepaid messages;
   b. generating a coded short text messaging system message based on the user's selection of the push mode of operation, and further based on the user's selections regarding desired information, criteria, and number of prepaid messages, wherein the generating of the coded short text messaging system message comprises translating a short text messaging system message that is in a human understandable format into a coded data format not understandable to the user of the mobile terminal; and
   c. outputting the short text messaging system message for sending to a content provider associated with the first or second client applications via a wireless telecommunications network;
(iii) receiving a coded short text messaging system response message from the content provider via the wireless telecommunications network, wherein the coded short text messaging system response message comprises compressed data;
(iv) decoding, by the first or second client application, the received short text messaging system response message using a listing of a set of short codes that comprises short codes unique to the first or second application and used to instruct the first or second application to translate at least a portion of the received short text messaging system message into human understandable information, and administrative short codes that are consistent for the first and second applications and used to instruct the first or second application; and
(v) displaying the human understandable information on a display screen.

10. The computer readable medium of claim 9, wherein the computer executable instructions further cause the mobile terminal to perform the method comprising:
   (vi) when the user selects the pull mode of operation, displaying one or more hierarchically arranged menus navigable by the user to allow the user to drill-down through the one or more menus to identify desired information that the user would like to receive;
   (vii) generating a coded short text messaging system request message containing the user's identified desired information; and
   (viii) outputting the coded short text messaging system request message for sending to the content provider via the wireless telecommunications network.

11. The computer readable medium of claim 9, wherein at least one of the administrative short codes instructs the mobile terminal to flush data stored in memory for the first or second application.

12. The computer readable medium of claim 9, wherein step (ii)(b) comprises referencing a table to identify appropriate short codes corresponding to the user's selections.

13. The computer readable medium of claim 9, wherein step (iv) comprises referencing a table to identify appropriate human-understandable descriptions corresponding to short codes received in the coded short text messaging system response message.

14. The computer readable medium of claim 9, wherein the human understandable information comprises text in a language native to a user of the mobile terminal.

15. The computer readable medium of claim 9, wherein the human understandable information comprises graphics.

16. The computer readable medium of claim 9, wherein the short text messaging system comprises SMS.

17. A method for distributing selected information to a user of a mobile terminal, comprising:
   receiving a first message originating from the mobile terminal sent over an asynchronous connectionless-based channel, wherein the first message comprises coded data indicating information desired by the user;
   (ii) querying a content provider database for the desired information;
   (iii) generating, by a processor, a second message comprising coded data corresponding to the desired information, wherein the generating of the second message comprises translating data that is in a human understandable format into a coded data format that is not understandable to the user of the mobile terminal using a set of short codes that comprises short codes unique to the first or second application, and administrative short codes that are consistent for the first and second applications and the administrative short codes are used to instruct the first or second application; and
   (iv) causing sending of the second message to the mobile terminal over the asynchronous connectionless-based channel.

18. The method of claim 17, wherein the first message further comprises one or more criteria indicating when to send the desired information to the user's mobile terminal, and an indication of a number of prepaid messages.

19. The method of claim 18, further comprising:
   (v) when the one or more criteria are met:
      a. performing steps (iii) and (iv); and
      b. adjusting the number of prepaid messages remaining for the user based on the second message.

20. The method of claim 17, wherein the first message and second message each comprise a SMS message.

21. The method of claim 20, further comprising:
   (vi) determining whether prepayment has been received for the response SMS message; and
   (vii) reverse billing the SMS response message to the mobile terminal when prepayment has not been received.

22. The method of claim 20, wherein the second message comprises a long SMS message.

23. A method of providing information via a channel to a mobile device, comprising:
   advertising for sale a predetermined number of coded messages corresponding to a predetermined event;
   receiving information indicating that payment from a first user for the predetermined number of messages has been received;
   updating based on the predetermined number of messages for which payment was received;
   translating data, by a processor, that is in a human understandable format into a coded data format that is not understandable to the user of the mobile terminal using a set of short codes that comprises short codes unique to the first or second application, and administrative short codes that are consistent for the first and second applications and the administrative short codes are used to instruct the first or second application;
   sending a plurality of coded messages for decoding by executable code on a mobile device associated with the user from whom payment was received, until the predetermined number of messages has been fully utilized, wherein one of the coded messages comprises the translated data.

24. The method of claim 23, wherein the predetermined number of messages comprises all messages corresponding to the predetermined event.

25. A method comprising:

loading a first or second local client executable application configured to code a coded text message provided by a content provider based on short codes and corresponding long identifiers, wherein the short codes and the long identifiers are customized to a topic of the content of the coded text message provided by the content provider;

receiving the coded text message from the content provider via a wireless communication system, wherein the coded text message comprises compressed data including instances of the short codes; and decoding, by a processor executing the first or second local client executable application, the coded text message using a set of short codes that comprises short codes unique to the first or second application and used to instruct the first or second application to translate at least a portion of the coded text message into human understandable format, and administrative short codes that are consistent for the first and second applications and used to instruct the first or second application, to identify and replace instances of the short codes in the coded text message with the long identifiers to generate a decoded text message.

* * * * *